United States Patent
Ihnen et al.

(10) Patent No.: US 9,296,241 B1
(45) Date of Patent: Mar. 29, 2016

(54) INK JET PRINTING AND PATTERNING OF EXPLOSIVE MATERIALS

(71) Applicants: Andrew C. Ihnen, Jersey City, NJ (US); Woo Young Lee, Ridgewood, NJ (US); Brian Fuchs, Hackettstown, NJ (US); Anne Marie Petrock, Flanders, NJ (US); Daniel Stec, III, Long Valley, NJ (US)

(72) Inventors: Andrew C. Ihnen, Jersey City, NJ (US); Woo Young Lee, Ridgewood, NJ (US); Brian Fuchs, Hackettstown, NJ (US); Anne Marie Petrock, Flanders, NJ (US); Daniel Stec, III, Long Valley, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 175 days.

(21) Appl. No.: 14/078,827

(22) Filed: Nov. 13, 2013

Related U.S. Application Data

(63) Continuation-in-part of application No. 12/961,709, filed on Dec. 7, 2010, now abandoned.

(60) Provisional application No. 61/287,832, filed on Dec. 18, 2009.

(51) Int. Cl.
| | |
|---|---|
| *B41M 3/00* | (2006.01) |
| *C06B 21/00* | (2006.01) |
| *C09D 11/30* | (2014.01) |
| *C09D 11/36* | (2014.01) |
| *C06B 45/00* | (2006.01) |

(52) U.S. Cl.
CPC ............ *B41M 3/006* (2013.01); *C06B 21/0033* (2013.01); *C09D 11/30* (2013.01); *C09D 11/36* (2013.01); *C06B 45/00* (2013.01)

(58) Field of Classification Search
None
See application file for complete search history.

(56) References Cited

U.S. PATENT DOCUMENTS

| | | | | |
|---|---|---|---|---|
| 5,046,425 | A * | 9/1991 | Gibbons, Jr. ............ | C06B 45/12 102/200 |
| 2002/0191063 | A1 * | 12/2002 | Gelbart et al. ................. | 347/101 |
| 2004/0138337 | A1 * | 7/2004 | Hasegawa et al. ............ | 523/160 |
| 2006/0236887 | A1 * | 10/2006 | Childs et al. .................. | 102/272 |
| 2006/0243151 | A1 * | 11/2006 | Vine et al. .................. | 102/202.5 |

OTHER PUBLICATIONS

Eastman, Eastman Butly Acetate, Aug. 14, 2015, http://www.eastman.com/pages/producthome.aspx?product=71001046.

* cited by examiner

*Primary Examiner* — Timothy Meeks
*Assistant Examiner* — Michael P Rodriguez
(74) *Attorney, Agent, or Firm* — Henry S. Goldfine

(57) ABSTRACT

A method of forming a very small, i.e. microliter, finely detailed explosive train for the ignition of energetic munitions—which train is formed by ink jetting picoliter volume droplets of an explosive ink onto the substrate; which explosive ink is a pure liquid that will not clog the ink jet printer. The explosive ink being a solution composed of a secondary organic explosive solute, a polymeric binder solute, and a polar aprotic organic solvent. Where the ink jet printer is a commercial piezoelectric type, drop-on-demand, ink jet printer capable of precisely delivering the subject picoliter volume droplets. And, which printer is capable of heating said substrate to an elevated temperature to more rapidly evaporate the solvent, leaving the desired, finely detailed, efficacious, crystalline explosive train.

14 Claims, No Drawings

INK JET PRINTING AND PATTERNING OF EXPLOSIVE MATERIALS

CROSS REFERENCE TO RELATED APPLICATIONS

This application is a continuation-in-part of co-pending parent U.S. patent application Ser. No. 12/961,709, filed Dec. 7, 2010, which parent patent application claims the benefit under 35 USC §119(e) of U.S. provisional patent application U.S. 61/287,832, filed on Dec. 18, 2009; and, which parent and provisional applications are both hereby incorporated by reference herein.

FEDERAL RESEARCH STATEMENT

The inventions described herein may be manufactured, used and licensed by, or for the U.S. Government, for U.S. Government purposes.

BACKGROUND OF INVENTION

1. Field of the Invention

The present invention relates to an explosive ink formulation which is stable, free flowing, and can be built up into fire train structures by deposition as nano- and micro-scale patterns using ink jet printers.

2. Related Art

Energetic munitions, such as flares, missiles, military ordinance, etc generally require three distinct components: first, an initiator, second, an explosive train to amplify the output from the initiator, and to ignite the third component, a main output charge, which can be a high explosive, a pyrotechnic, or a propellant. Generally initiators are manufactured of primary explosives (e.g., lead styphnate and the like) which possess relatively low explosive output; but, are highly sensitive explosives that may detonate in response to a small "insult." The explosive train is generally manufactured of secondary explosives which possess a higher explosive output than the initiator; but, are of lesser sensitivity, requiring a strong shock to detonate—a shock which is provided by the initiator. With the relatively recent emergence of smart weapon systems, such as Micro-Energetic Initiators (MEIs) for Micro Electro-mechanical Mechanisms (MEMs) fuze devices, that are much lighter, smaller, and more survivable than classical initiation devices—the need exists for correspondingly smaller, more precise, explosive trains. Such explosive trains, that contain very small (i.e. microliter) volumes of secondary explosives cannot be manufactured using the standard methods of press-loading or cast loading (whether using melt-cast or cure-cast techniques).

U.S. Pat. No. 7,052,562, Stec et al, discloses a method for loading secondary crystalline energetic materials, such as CL-20, HMX, RDX, TNAZ, PETN, and NNS, into small volume loading holes which form a firing train—the crystalline energetic material being in the form or a slurry or paste in a mixed ethanol and ethyl acetate solvent system, with a polymeric binder incorporated therein as a latex suspension or an emulsion. This slurry or paste is further disclosed as being loaded into the small volume loading holes by direct physical means, such as by (1) placing the slurry or paste onto a blade and wiping that blade over the fixture to force the slurry or paste into the loading holes in the fixture, or (2) placing the slurry or paste into a pipette or syringe and forcing the slurry or paste through the orifice thereof into the loading holes, or (3) using a pump to force the slurry or paste into the loading holes. These mechanical means do not lend themselves to the application/delivery of a finely detailed fire train.

U.S. Pat. No. 7,052,562, further discloses that while it has been known that ink jet printing can accurately deliver small volumes of material—such technology has been dismissed as unsuitable for the deposition of the subject small volume explosive fire trains, for two reasons. First, most inks used for ink jet printing are dye-based, i.e. the colorant dye is dissolved in the fluid medium—which has until now not been conceived as possible with an energetic component—and; although there are pigment-based ink jet inks available, wherein the colorant is an undissolved crystalline material, such undissolved solids can negatively affect ink jet mechanisms. Secondly, in piezoelectric discharge drop-on-demand ink jet printing, which is the most relevant ink jet method, the droplets of ink are subjected to a piezoelectric discharge, as well as, elevated pressure and temperature; which combination of discharge, temperature, and pressure are a safety hazard in combination with undissolved particulate energetic material.

Published U.S. Patent Application 2006/0243151, to Vine et al, discloses a relatively insensitive slurry explosive ink formulation which can be directly printed onto a substrate using a multiplicity of techniques, such as, screen printing or rotary gravure printing techniques, brushing, dipping or spraying, as well as, by using ink jet or dot matrix printers. The slurry explosive ink formulation disclosed comprises a binder, at least one metal, such as aluminum, titanium or iron; at least one non-metal from Group III or IV or a metal oxide where the metal and non-metal particles are 10 microns or less in diameter; but, typically the upper limit for the particle size for the metals is of the order of one to two microns, while for the non-metals it is of the order of 5 microns. Such slurry explosive ink formulations may clog an ink jet printer's nozzles—as will any slurry's having particles with a diameter greater than 200 nano-meters. And, importantly, any such use of an ink jet printer is disclosed solely for applying an initiator, which initiator is used in conjunction with an electrical triggering device, e.g. an adjacent heating element.

Thus there is a need in the art for a non-slurry (i.e. solution) material and technique to accurately lay down a finely detailed secondary explosive structure in a fire train pattern, on various substrates, in very small volumes, e.g. part of a MEMs fuze—to amplify the output from the initiator and to ignite the main output charge—for use in smart weapon systems and the like.

SUMMARY OF INVENTION

In order to achieve the objective of accurately laying down a finely detailed explosive ink pattern on a substrate, to form a functional secondary explosive train, the subject invention is comprised of an explosive ink, which is a solution, which is delivered to the desired substrate by a commercially available piezoelectric type, drop-on-demand ink jet printer, the subject explosive ink solution containing (1) a secondary organic explosive material, preferably cyclo-1,3,5-trimethylene-2,4,6-trinitramine (RDX); (2) a polymeric binder, preferably cellulose acetate butyrate (CAB) or polyvinyl acetate (PVAC); (3) and, a polar aprotic organic solvent, such as dimethylformamide (DMF) capable of dissolving the necessary quantity of secondary organic explosive material; wherein, (4) said organic solvent is not a protic polar solvent, Which liquid, i.e. solution, can contain from about 20 to about 30 weight percent of the secondary explosive, about 0.01 to about 10 weight percent binder, with the balance, i.e. quantity sufficient, or q.s., being the organic solvent; a solution wherein there is no residual particulate matter to clog the ink jet printer (said solution containing no particles of greater than 200 nanometers in diameter).

Surprisingly, the subject explosive ink, with the secondary explosive energetic material fully in solution therein, is so energetically stable so as to withstand the pressures and temperatures of a piezoelectric type ink jet printer without danger of ignition, explosion, or detonation.

After the subject explosive ink pattern is delivered onto the desired substrate by the commercial ink jet printer—the dissolved secondary organic explosive and polymeric binder co-precipitate to form the desired micro-scale explosive pattern—with the evaporation of the solvent. Wherein, upon evaporation of the solvent, a dry and finely detailed secondary explosive train is formed on the substrate, having preferably, a secondary explosive content of from about 95 to about 99.5 wt. percent of the dry secondary explosive train. Further, by repetitively laying down this pattern, a three dimensional thickness or structure can be built-up—forming a detonable structure for the desired small volume explosive train.

Further features and advantages of the present invention will be set forth in, or apparent from, the detailed description of preferred embodiments thereof which follows.

DETAILED DESCRIPTION

In one aspect, the present invention is comprised of liquid explosive inks which include a solute comprised of an organic explosive and a binder, and a polar aprotic organic solvent (e.g. no protic polar solvent)—forming a solution suitable for use with piezoelectric type drop-on-demand ink jet printers. Such liquid explosive inks do not contain any colloidal suspensions or solid particles—as the organic explosive and binder are in solution within the solvent—thereby eliminating clogging of the piezoelectric type drop-on-demand ink jet printers, whose jet nozzles will clog with inks containing particles of about 200 nm or greater in diameter. Such a free flowing liquid explosive ink are relatively stable and can be delivered accurately as picoliter volume droplets onto any desired substrate by such ink jet printers in the form of an explosive train pattern. Repeated delivery of such a pattern by the ink jet printer, one on top of the previous, allows build-up thereof to the desired thickness necessary for an effective explosive train as part of the initiation of an energetic munition.

Suitable organic solvents for use in the subject invention include polar aprotic solvents such as dimethylformamide (DMF), dimethyl sulfoxide (DMSO), dioxane, hexamethylphosphorotriamide, tetrahydrofuran, dichloromethane (DCM), ethyl acetate, butyl acetate, acetone, acetonitrile (MeCN), and the like, or a mixture thereof. DMF is a preferred solvent, with a useful viscosity and surface tension of approximately 0.92 centipoise and 37.1 dynes/cm, respectively, at 20 degrees centigrade. The use of DMF as the solvent of choice is especially useful with the selection of RDX as the secondary explosive, as it was found that the solubility of RDX therein is 340 g/l—a high solubility critical to dissolving the maximum RDX content for maximum energy output. In fact, RDX up to about 23 weight percent can be dissolved in DMF with negligible change to the viscosity and surface tension of the preferred DMF-based explosive ink.

Interestingly, alternative solvents to the particular, inventive polar aprotic organic solvents of choice detailed above, have been found significantly wanting. Use of water as the solvent of choice resulted in the need to use unreasonably high surfactant concentrations, to obtain the desired surface tension. Use of other organic solvents, such polar protic solvents (e.g. alcohol, i.e. ethanol or methanol) has led to nano-particle crystalline growth within the organic explosive material, e.g. RDX, which nano-particles cannot be utilized in the desired piezoelectric type, drop-on-demand ink jet printer.

In a particularly preferred embodiment of the present invention, the addition of 2 weight percent CAB (molecular weight of 65,000) to the RDX in DMF solution, increased the viscosity of the RDX/DMF explosive ink solution to a desired about 10 centipoise. Preferably, the viscosity of the subject inventive explosive ink is between about 10 and about 12 centipoise.

Particular substrates for printing the organic explosive inks of the subject invention using ink jet printers; includes, without limitation, any rigid or flexible substrate, which may be metallic, ceramic, dielectric, polymeric, or organic in construction. The particular organic explosive is preferably RDX, but not limited thereto—alternative embodiments may include such organic explosives as cyclotetramethylene tetranitramine (HMX), pentaerythritol tetranitrate (PETN), or the like.

As stated, ink jet printers useful with the explosive inks of the present invention preferably utilize a piezoelectric drop-on-demand ink delivery system—which printers can deliver programmed, on-demand, droplets of from about 1 picoliters (pL) to about 10 pL microscopic ink droplets. Therefore, the desired explosive train is formed of ink droplets, each of which produces a generally disc-shaped upon the substrate after losing the solvent by evaporation—each disc having a diameter of about 20 to about 50 micrometers. The spacing between the droplets is controllable by the adjustments to the printer between 5 and 250 microns—a spacing of between 5 to 50 micrometers is preferred to maximize the overlap of the droplets upon the substrate, for a more solid fire train pattern. Further, pattern thicknesses of up to about 100 microns, to about 150 microns or more were achieved by repeating the printing process, i.e. each pass of the substrate under the ink jet printer formed a layer, with each layer being from about 0.5 to about 1 micron—until the desired thickness was achieved. Further, it is noteworthy that the pattern thickness that may be obtained in each pass, and in total, is limited only by the capabilities of the printer—where such printers may have more than one head and thereby reduce the number of required passes (for the build-up to the desired thickness).

In order to produce desired stable ink droplets, the viscosity and surface tension of the explosive ink solution should be controlled in the viscosity range of about 10 to about 12 centipoise, and about 28 to about 33 dynes/cm, respectively. Also, the boiling point of the subject inks should be higher than that of pure water, to mitigate premature solvent evaporation of ink droplets at the nozzle/air interface. In an exemplary embodiment, a commercial piezoelectric type, drop-on-demand ink jet printer manufactured by Fujifilm®, the Dimatix® Materials Printer, Model No. DMP2800, Fujifilm Dimatix Corp., Lebanon, N.H., was used to demonstrate the printing and patterning of explosive inks of the subject invention which printer has a preferred nozzle diameter of about 25 microns—to provide the desired droplet of about 1 pL to about 10 pL.

As stated, preferably a DMF solvent based explosive ink formulation is used, which can be formulated with from about 20 to about 30 weight percent RDX and about 0.01 to about 10 weight percent CAB binder. Further, preferably, the substrate is heated to at least about 30 to about 40 degrees centigrade or more. More preferably, the substrate should be heated to an elevated temperature of at least about 60 degrees centigrade. Such increased temperature results in more rapid evaporation of the solvent and growth of RDX crystals within the deposited material—after the RDX phase was nucleated on the substrate surface. Micro-characterization of such deposited crystalline explosive material, at such an elevated temperature, shows it to have a desirable crystalline structure, formed in part by lateral growth of the RDX crystals. Also, with additional printer passes, to build up the pattern thickness, each layer showed RDX crystals on the top surface of the underlayer(s), without nucleation of the new crystals in the top layer. Building such a layered thickness is critical to the explosive nature and degree of explosivity possible from the subject direct deposition.

Although the invention has been described above in relation to preferred embodiments thereof, it will be understood by those skilled in the art that variations and modifications can be effected in these preferred embodiments without departing from the scope and spirit of the invention as claimed below.

What is claimed is:

1. A method of patterning an explosive train on a substrate comprising the steps of:
    formulating an explosive liquid ink solution consisting essentially of a secondary organic explosive material, and a polymeric binder, dissolved in a polar aprotic solvent;
    wherein said explosive liquid ink solution is free of water and free of any protic polar solvent;
    ink jet printing said explosive liquid ink solution using a piezoelectric type, drop-on-demand ink jet printer to form the pattern of the explosive train on a substrate.

2. The method of patterning an explosive train of claim 1, wherein said ink jet printing deposits ink droplets upon the substrate, each droplet producing a generally disc-shape upon the substrate after solvent evaporation.

3. The method of patterning an explosive train of claim 2, wherein said disc shaped elements are about 20 to about 50 microns in diameter.

4. A method of forming an explosive train on a substrate comprising the steps of:
    formulating an explosive liquid ink solution consisting essentially of a secondary organic explosive material, and a polymeric binder, dissolved in a polar aprotic organic solvent;
    wherein said explosive liquid ink solution is free of water and free of any protic polar solvent;
    ink jet printing said explosive liquid ink using a piezoelectric type, drop-on-demand ink jet printer on the substrate to form the pattern of the explosive train; and
    repeating said ink jet printing of said pattern on top of the prior pattern, thereby forming layers to build up the thickness of said pattern, thereby forming the explosive train.

5. The method of forming an explosive train of claim 4, wherein said polar aprotic organic solvent is dimethylformamide.

6. The method of forming an explosive train of claim 4, wherein the substrate is heated to an elevated temperature of at least about 30 degrees centigrade during said ink jet printing.

7. The method of forming an explosive train of claim 4, wherein the substrate is heated to an elevated temperature of at least about 60 degrees centigrade.

8. The method of forming an explosive train of claim 4, wherein the layers are from about 0.5 to about 1.0 microns thick.

9. The method of forming an explosive train of claim 4, wherein the layers are built up to a thickness of up to about 100 microns.

10. The method of forming an explosive train of claim 4, wherein said substrate is selected from the group consisting of a metallic, ceramic, dielectric, polymeric, and organic material.

11. The method of forming an explosive train of claim 1, wherein said secondary organic explosive material is selected from the group consisting of cyclo-1,3,5-trimethylene-2,4,6-trinitramine (RDX), cyclotetramethylene tetranitramine (HMX), and pentaerythritol tetranitrate (PETN).

12. The method of forming an explosive train of claim 1, wherein said polar aprotic solvent is selected from the group consisting of dimethylformamide (DMF), dimethyl sulfoxide (DMSO), dioxane, hexamethylphosphorotriamide, tetrahydrofuran, dichloromethane (DCM), butyl acetate, acetone, acetonitrile (MeCN) or a mixture thereof.

13. A method of patterning an explosive train on a substrate comprising the steps of:
    formulating an explosive liquid ink solution consisting essentially of cyclo-1,3,5-trimethylene-2,4,6-trinitramine (RDX) and a binder wherein said binder is polyvinyl acetate (PVAC) or cellulose acetate butyrate (CAB), and wherein said RDX and binder is dissolved in dimethylformamide (DMF);
    printing said explosive liquid ink solution using a piezoelectric type, drop-on-demand ink jet printer to form a pattern of the explosive train on a substrate and precipitating the RDX and binder on said substrate.

14. The method of claim 13 wherein the explosive liquid ink solution contains about 20 to about 30 weight percent of RDX and about 0.01 to about 10 weight percent of binder.

* * * * *